US008014355B2

(12) United States Patent
Koga

(10) Patent No.: US 8,014,355 B2
(45) Date of Patent: *Sep. 6, 2011

(54) SERVICE APPARATUS, METHOD OF CONTROLLING SWITCHING OF CONNECTION DESTINATION OF CLIENT APPARATUS BY SERVICE APPARATUS, AND STORAGE MEDIUM READABLE BY MACHINE

(75) Inventor: Kifumi Koga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 598 days.

This patent is subject to a terminal disclaimer.

(21) Appl. No.: 11/239,065

(22) Filed: Sep. 30, 2005

(65) Prior Publication Data
US 2006/0251104 A1 Nov. 9, 2006

(30) Foreign Application Priority Data
Mar. 31, 2005 (JP) ................. 2005-102449

(51) Int. Cl.
*H04W 4/00* (2009.01)
(52) U.S. Cl. ........................ 370/331; 370/332
(58) Field of Classification Search .............. 370/331, 370/321, 229, 314, 335, 352; 455/33, 426, 455/103, 436, 411; 375/132
See application file for complete search history.

(56) References Cited

U.S. PATENT DOCUMENTS

| 4,597,105 | A | * | 6/1986 | Freeburg ........................ 455/524 |
| 6,393,261 | B1 | * | 5/2002 | Lewis ........................... 455/103 |
| 6,990,343 | B2 | * | 1/2006 | Lefkowitz ...................... 455/436 |
| 7,193,991 | B2 | * | 3/2007 | Melpignano et al. ......... 370/352 |
| 7,363,038 | B2 | | 4/2008 | Kim et al. |
| 2003/0035464 | A1 | | 2/2003 | Dehner et al. |
| 2003/0169716 | A1 | | 9/2003 | Saito |
| 2004/0224690 | A1 | | 11/2004 | Choi et al. |
| 2005/0053034 | A1 | * | 3/2005 | Chiueh ......................... 370/331 |
| 2005/0265284 | A1 | * | 12/2005 | Hsu et al. ..................... 370/331 |
| 2005/0282546 | A1 | * | 12/2005 | Chang et al. ................. 455/436 |
| 2006/0040656 | A1 | * | 2/2006 | Kotzin ....................... 455/426.2 |
| 2006/0083199 | A1 | * | 4/2006 | Yang ............................ 370/331 |

(Continued)

FOREIGN PATENT DOCUMENTS

JP 9-98486 4/1997

(Continued)

OTHER PUBLICATIONS

German Office Action for corresponding application No. DE102005038445.5. A partial English-language translation is provided.

(Continued)

*Primary Examiner* — Kwang B Yao
*Assistant Examiner* — Syed M Bokhari
(74) *Attorney, Agent, or Firm* — Fujitsu Patent Center

(57) ABSTRACT

When a service apparatus detects a predetermined state, the service apparatus selects one of a plurality of client apparatuses connected to the service apparatus and selects a client apparatus to which a connection should be cut. The service apparatus determines another service apparatus to be a redirection destination of the client through communication with other service apparatuses which are capable of establishing a connection with the client. The service apparatus gives control information to the other service apparatuses and inhibits transmission of a response, which indicates that connection with the client is possible, corresponding to a probe request from the client apparatus for a given period of time.

11 Claims, 6 Drawing Sheets

U.S. PATENT DOCUMENTS

2006/0148451 A1* 7/2006 Narasimha .................... 455/411

FOREIGN PATENT DOCUMENTS

| JP | 2000-069050 | 3/2000 |
|---|---|---|
| JP | 2001-54165 | 2/2001 |
| JP | 2001-94572 | 4/2001 |
| JP | 2001-237856 | 8/2001 |
| JP | 2002-64848 | 2/2002 |
| JP | 2002-185458 | 6/2002 |
| JP | 2003-174456 | 6/2003 |
| JP | 2003-235069 | 8/2003 |
| JP | 2003-244167 | 8/2003 |
| JP | 2003-324449 | 11/2003 |
| JP | 2004-15435 | 1/2004 |
| JP | 2004-72200 | 3/2004 |
| JP | 2004-140614 | 5/2004 |
| JP | 2004-221684 | 8/2004 |
| WO | WO 2004-004226 A2 | 1/2004 |

OTHER PUBLICATIONS

First Notification of Office Action issued by the State Intellectual Property Office of China on Jan. 18, 2008 in the corresponding Chinese Patent Application No. 200510099147.1 (7 pages) with 3 pages in English translation, includingText of the First Office Action (English translation consisting of 6 pages).

* cited by examiner

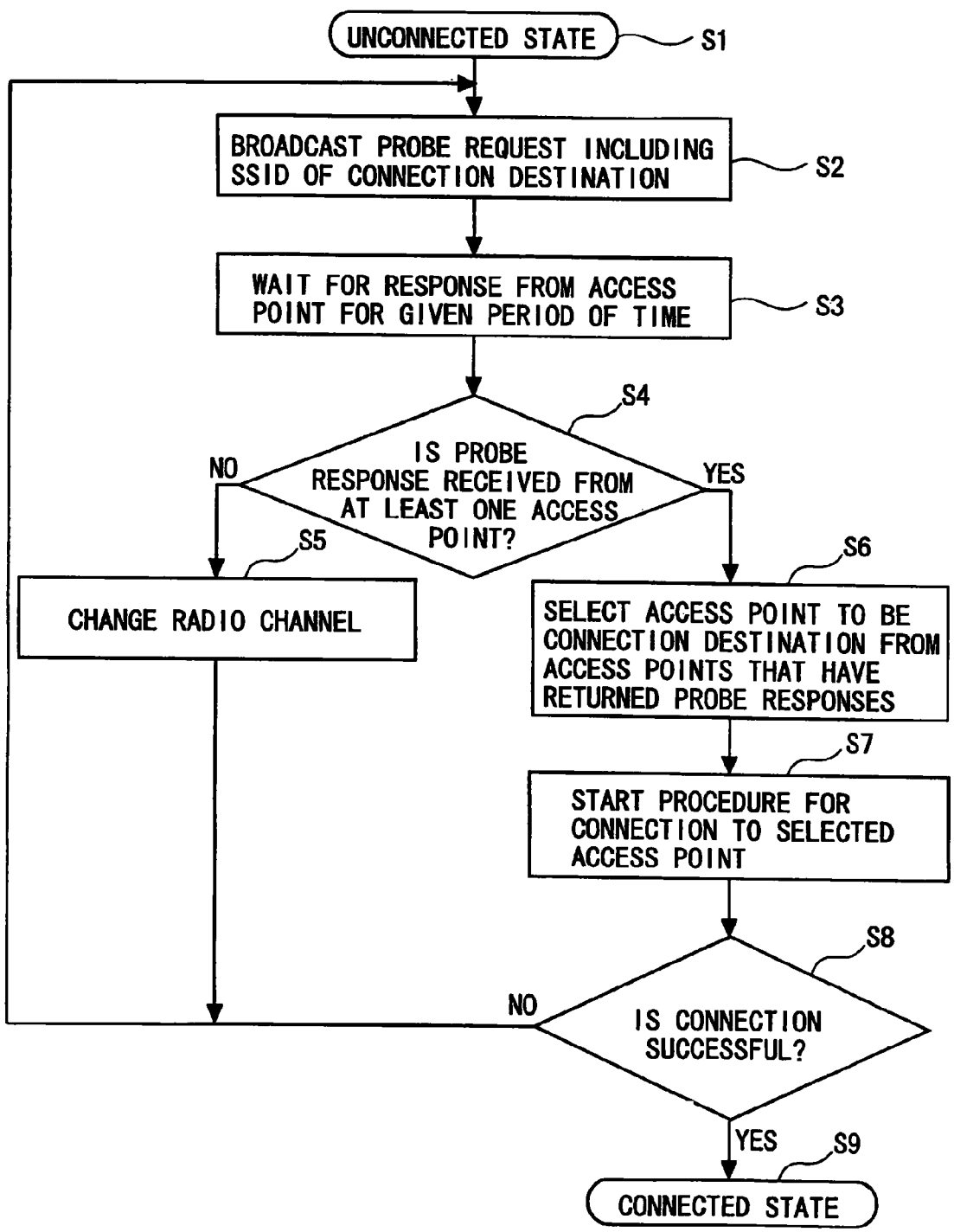

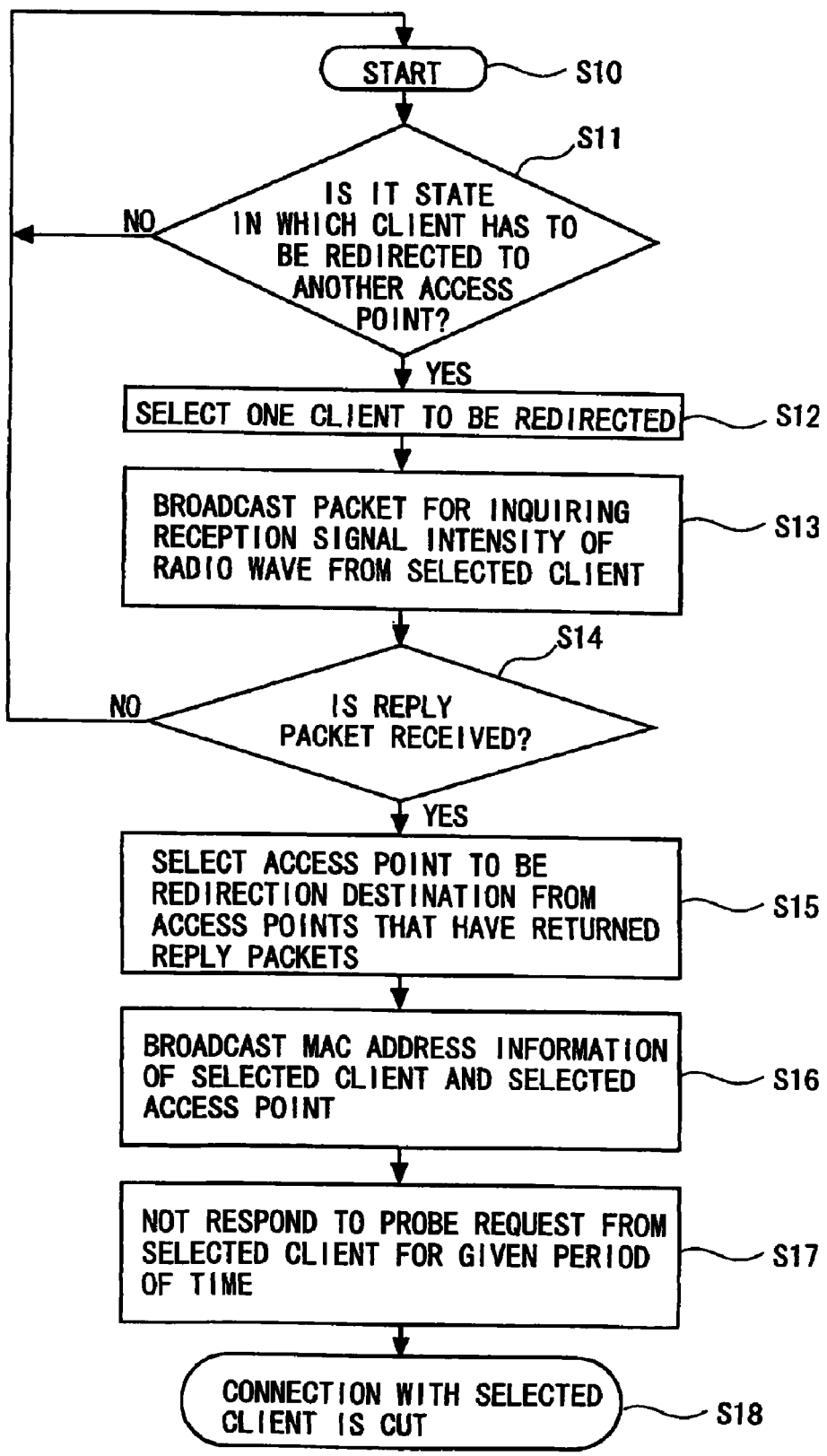

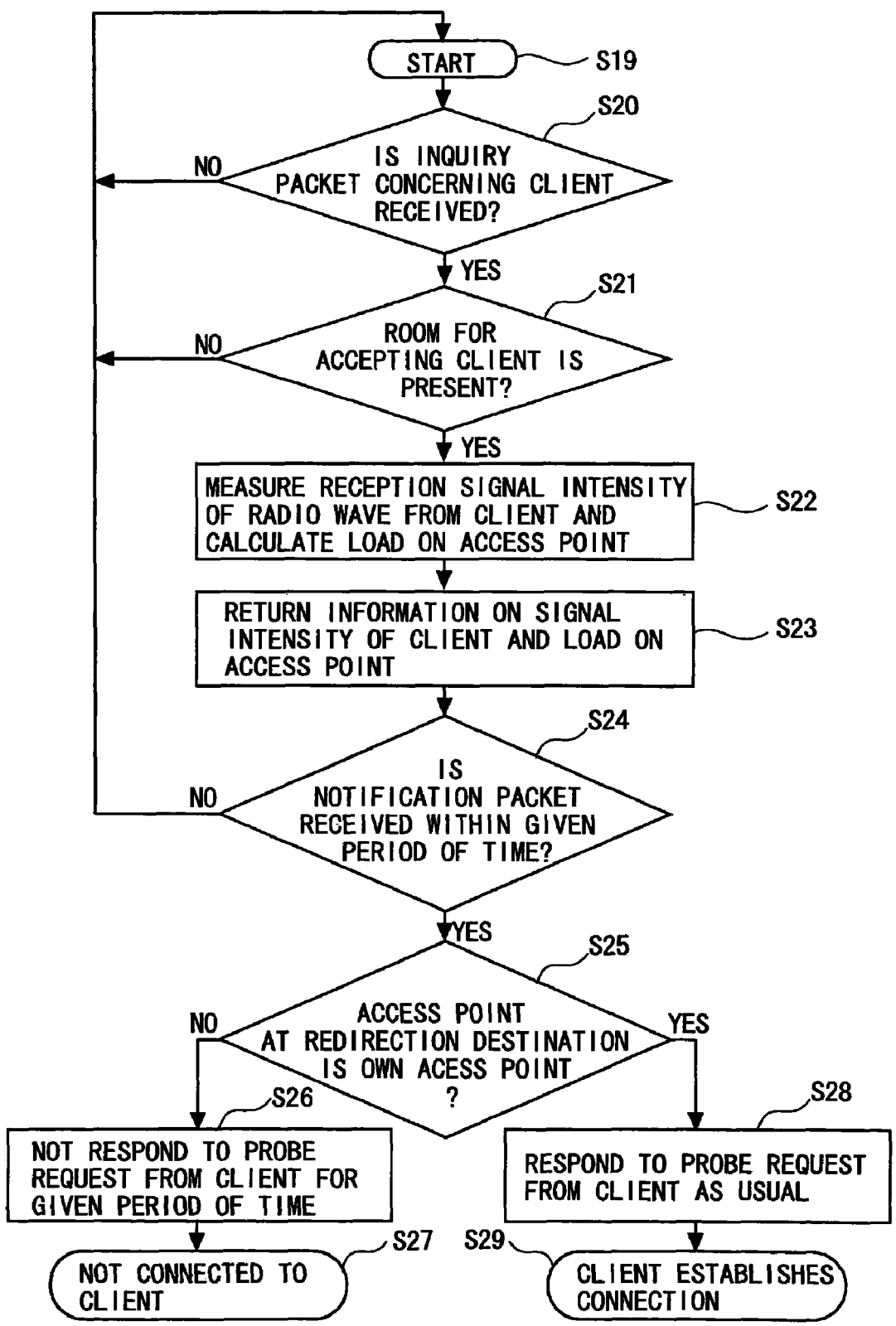

SERVICE APPARATUS, METHOD OF CONTROLLING SWITCHING OF CONNECTION DESTINATION OF CLIENT APPARATUS BY SERVICE APPARATUS, AND STORAGE MEDIUM READABLE BY MACHINE

BACKGROUND OF THE INVENTION

1. Field of the Invention

The present invention relates to a service apparatus, a method of controlling switching of connection destination of a client apparatus by the service apparatus, and a storage medium readable by a machine.

2. Description of the Related Art

Since communication by a wireless LAN (Local Area Network) has no limitation on wiring and is high in convenience, various service apparatuses and service methods of the wireless LAN have been studied.

A system of the wireless LAN includes an access point of the wireless LAN (which may be hereinafter simply referred to as "access point") and a communication apparatus of the wireless LAN that is connectable to the access point through radio transmission (which may be hereinafter simply referred to as "client").

When a user uses the wireless LAN, the client sends a packet, which includes identification information called an SSID (Service Set ID) capable of identifying the access point and an MAC (Media Access Control) address serving as identification information of the client, as a connection request.

When the connection request reaches the access point, the access point reads the SSID and the MAC address from the packet of the connection request. The access point uses the SSID to judge whether the connection request is a request for connection to the own access point.

As a result of the judgment, if the connection request is not a request for connection to the own access point, the access point does not send a response to the MAC address that is received simultaneously with the SSID. On the other hand, as a result of the judgment, if it is judged that the connection request is a request for connection to the own access point, the access point sends a response to the MAC address that is received simultaneously with the SSID. In this way, the client and the access point are connected.

Next, a case in which there are plural access points will be explained. The respective access points have a common SSID. When a packet of a connection request is received from a client, if it is possible to respond to this connection request, the respective access points give MAC addresses of the own access points to packets for response and respond to the connection request.

When the client receives response packets from the plural access points, the client measures reception intensities of the respective packets and makes connection to the access point with the highest signal intensity through the MAC address.

Thereafter, the access point connected to the client notifies the other access points of that the access point is connected to the client by using a broadcast packet. In this way, when there are plural access points, an access point selected on a client side and the client are connected. Then communication of the wireless LAN is performed between the access point and the client.

The followings are related arts to the present invention.

When there are plural clients for one access point, throughput per one client falls as the number of clients increases. In this case, it is necessary to maintain throughput of the clients in a practical range.

In order to solve the problem, it is conceivable to decentralize access points to which clients establish connection by setting the number of access points to the equal to the number of clients. However, as described above, since the clients establish connection to an access point with a highest signal intensity, it is likely that accesses from plural clients concentrate on a specific access point. In this case, it is impossible to realize decentralization of proper accesses.

In addition, it is also conceivable to realize decentralization of access points by assigning a different SSID to each client and limiting access points that respective clients can use. However, in this case, since the number of access points that the clients can use decreases, it is likely that locations where wireless LAN communication can be performed satisfactorily are limited.

Moreover, the patent document 1 discloses a method of changing a radio channel of a client connected to an access point handling high traffic to a radio channel of another access point. However, in the method disclosed in the patent document 1, it is necessary to add new functions to firmware of access points and radio drivers of clients. Therefore, it is necessary to modify both the access points and the clients.

[Patent document 1] Japanese Patent Laid-Open Publication No. 2001-237856

[Patent document 2] Japanese Patent Laid-Open Publication No. 2002-185458

[Patent document 3] Japanese Patent Laid-Open Publication No. 2003-174456

[Patent document 4] Japanese Patent Laid-Open Publication No. 2004-140614

[Patent document 5] Japanese Patent Laid-Open Publication No. 2004-221684

SUMMARY OF THE INVENTION

It is an object of the present invention to provide a technique that can realize, under an environment in which plural access points and plural clients are present, decentralization of proper connection of the clients to the respective access points.

In order to solve the problems, the present invention adopts the following constitution.

(1) That is, according to the present invention, there is provided a service apparatus providing a radio connection service to client apparatuses by returning a response in response to a probe request from an unconnected client apparatus to execute a radio connection procedure with the client apparatus, and by returning a response in response to a probe request from a connected client apparatus to continue a connected state with the client apparatus, the service apparatus including: a selecting unit selects a client apparatus to which connection should be cut when a predetermined state is detected; a unit requests a response, which indicates that connection is possible, to other service apparatuses connected through a network in response to a probe request from the selected client apparatus; and a unit inhibits transmission of the response, which indicates that connection is possible, for a given period of time in response to a probe request from the selected client after the connection with the selected client apparatus is cut.

(2) Further, the service apparatus of the present invention may have such a structure that the unit that requests the response, which indicates that connection is possible, in response to the probe request from the selected client apparatus, includes: a unit transmits an inquiry about states of the other service apparatuses; a receiving unit receives, from the other service apparatuses responding to the inquiry, replies that include state information indicating the states of the other service apparatuses through a network; a determining unit determines another service apparatus, which should be a new connection destination of the selected client apparatus, from the other service apparatuses at transmission sources of the replies based on the state information included in the received replies; and a unit transmits control information through a network, which is used by the determined another service apparatus to respond to a probe request from the selected client apparatus and is used by the other service apparatuses other than the determined another service apparatus to inhibit transmission of a response, which indicates that connection is possible, for a given period of time in response to a probe request from the selected client apparatus, the control information including identification information of the determined another service apparatus and identification information of the selected client apparatus to the other service apparatuses.

(3) Further, the service apparatus of the present invention may have such a structure that the state information includes intensities of reception signals from the selected client apparatus in the other service apparatuses, and the determining unit determines another service apparatus with a most satisfactory reception signal intensity as a redirection destination of the client apparatus.

(4) Further, the service apparatus of the present invention may have such a structure that the state information further includes information indicating processing loads in the other service apparatuses, and the determining unit determines another service apparatus to be a redirection destination of the client apparatus based on the reception signal intensities and the processing loads.

(5) Further, the service apparatus of the present invention may further includes a unit inhibits, when identification information of a service apparatus included in the control information received from the other service apparatuses does not coincide with identification information of the own service apparatus, transmission of a responses that indicates that connection is possible for a predetermined period in response to a probe request from the selected client apparatus.

(6) Further, the service apparatus of the present invention may further includes: a unit judges whether a client apparatus at a transmission source of a probe request is unconnected to the own service apparatus; and a unit judges, when the client apparatus is unconnected, whether it is possible to connect the client apparatus to the service apparatus, in which when the client apparatus cannot be connected, the inquiry is executed on the other service apparatuses.

(7) Further, the service apparatus of the present invention may have such a structure that the selecting unit selects a client apparatus with a lowest reception signal intensity from plural client apparatuses connected to the own service apparatus.

(8) Further, the service apparatus of the present invention may have such a structure that the selecting unit executes the selection of a client apparatus, when it is detected that a load on the own service apparatus is equal to or larger than a predetermined value.

(9) Further, the service apparatus of the present invention may have such a structure that the selecting unit executes the selection of a client apparatus, when it is detected that the number of client apparatuses to be connected to the own service is equal to or larger than a predetermined value.

(10) Further, according to the present invention, there is provided a method of controlling switching of a connection destination of a client apparatus by a service apparatus included in a group of service apparatuses providing a radio connection service to client apparatuses by returning a response in response to a probe request from an unconnected client apparatus to execute a radio connection procedure with the client apparatus, and by returning a response in response to a probe request from a connected client apparatus to continue a connected state with the client apparatus, in which the service apparatus selects a client apparatus to which connection should be cut when a predetermined state is detected, requests a response, which indicates that connection is possible, from other service apparatuses connected through a network in response to a probe request from the selected client apparatus, and inhibits transmission of the response, which indicates that connection is possible, for a given period of time in response to a probe request from the selected client after the connection with the selected client apparatus is cut.

(11) Further, according to the present invention, there is provided a storage medium readable by a machine, tangible embodying a program of instructions executable by the machine, causing a service apparatus included in a group of service apparatuses providing a radio connection service to client apparatuses by returning a response in response to a probe request from an unconnected client apparatus to execute a radio connection procedure with the client apparatus, and by returning a response in response to a probe request from a connected client apparatus to continue a connected state with the client apparatus, to perform control for switching a connection destination of the client apparatus, a storage medium readable by a machine, tangible embodying a program of instructions executable by the machine to perform the method steps comprising: selecting a client apparatus to which connection should be cut when a predetermined state is detected, requesting a response, which indicates that connection is possible, from other service apparatuses connected through a network in response to a probe request from the selected client apparatus, and inhibiting transmission of the response, which indicates that connection is possible, for a given period of time in response to a probe request from the selected client after the connection with the selected client apparatus is cut.

According to the present invention, it is possible to realize proper decentralization of connection of the clients to the respective service apparatuses under an environment in which plural service apparatuses and plural clients are present.

BRIEF DESCRIPTION OF THE DRAWINGS

FIG. 4 is a flowchart showing processing at the time when a client establishes connection to an access point;

FIG. 5 is a flowchart showing processing at the time when an access point redirects a client to another access point;

FIG. 6 is a flowchart showing processing at the time when an access point redirects a client establishing connection to another access point to the own access point.

DETAILED DESCRIPTION OF THE PREFERRED EMBODIMENT

An embodiment of the present invention will be hereinafter described with reference to the drawings. A constitution of the embodiment described below is only an example. The present invention is not limited to the constitution of the embodiment.

<<Principle of a System>>

A communication system according to the embodiment includes plural wireless LAN access points (equivalent to the "service apparatuses" of the present invention) and plural wireless LAN clients (wireless LAN terminals). The respective access points have an SSID shared among the access points and MAC addresses peculiar to the access points.

The SSID is used by the access points to identify that the clients are about to receive a communication service through the access points. The MAC addresses are used for identifying the individual access points.

The clients have peculiar MAC addresses. Further, the clients know the SSIDs of the access points in advance through installation or the like from a storage medium.

The access points are connected by network cables. Communications among the access points are performed through network cables. It is possible to apply, for example, Ethernet (registered trademark) to a communication network connecting the access points. The communication network connecting the access points is called a "sub-network", hereinafter.

Figure 1:
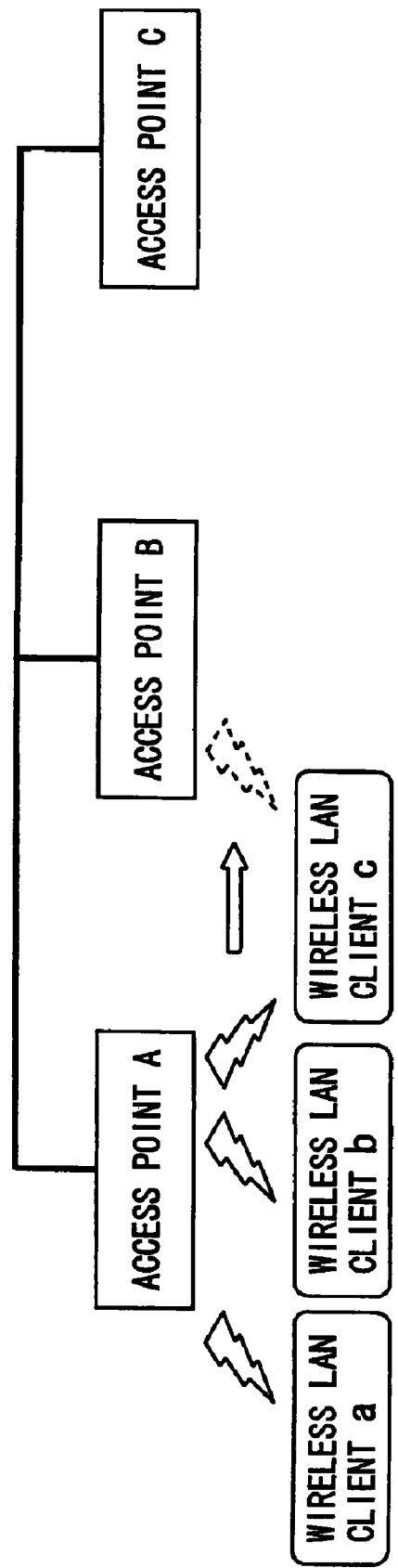
FIG. 1 is a diagram showing a network of a communication system.

FIG. 1 is a diagram showing an example of a network constitution of a communication system according to this embodiment. In the example shown in FIG. 1, the communication system includes access points A, B, and C, which are connected to one another through a communication network, and clients (wireless LAN clients) a, b, and c. FIG. 1 shows a state in which the clients a, b, and c establish connection to the access point A.

The communication system switches an access point, to which clients are establishing connection, to another access point according to judgment on the access point side. FIG. 1 shows, as an example, a state in which the client c establishing connection to the access point A is switched to a state in which the client c establishing connection to the access point B.

<Client>

When a client performs communication using the wireless LAN, the client sends a probe packet (a probe request) including an SSID (Service Set ID) and an MAC address of the client. The probe packet is also used when a client establishing connection with an access point confirms connection with the access point.

The client sends the probe packet at predetermined time intervals measured by a timer provided in the client. The client can receive probe response packets (probe responses) from plural access points, which are capable of receiving the probe packet and establishing connection with the client, respectively.

The probe response packet includes MAC addresses of access points for identifying the access points together with an MAC address of the client. When the client receives the probe response packets from the plural access points, the client specifies an access point, which sends a strongest signal to the client, based on signal intensities of the respective probe response packet. The client uses the MAC address of the specified access point to transmit a connection request to the access point.

In this way, the client can take a procedure for connection to the access point with which the client can perform radio communication satisfactorily.

When the client is connected to an access point, if there is no response from the partner access point within a predetermined period after sending a probe packet, the client cuts the connection with the access point. When the client cuts the connection with the access point, the client sends a disconnection request packet to the access point. In this way, the client can cut connection with an access point that is in an unsatisfactory connection state.

When the client is connected to an access point, if the client receives probe response packets from other access points with which the client does not establish connection, the client measures reception signal intensities and requests an access point having a highest signal intensity to establish connection. Thereafter, when the client makes connection with an access point different from the currently connected access point, the client sends a disconnection request packet for disconnecting communication to the currently connected access point. In this way, it is possible to execute switching to an access point with which radio communication can be performed more satisfactorily.

When the client has sent a probe packet to an access point, the client waits for arrival of a probe response packet for a given period of time. When a probe response packet does not arrive from the access point within the given period of time, the client changes a radio channel used for connection with the access point and, then, sends a probe packet through the radio channel after the change. A frequency bandwidth used in wireless LAN communication is divided and allocated to the radio channel. In the wireless LAN, when a radio channel of the same frequency band is used between an access point and a client, the client and the access point can perform communication. In this way, the client may also establish connection to an access point through a different radio channel.

<Access Point>

An access point reads an SSID and an MAC address of a client from a probe packet received from the client. The access point judges whether the probe packet is a connection request to the own access point according to information included in the SSID.

As a result of the judgment, if the probe packet is not a connection request to the own access point, the access point does not respond to the client at a transmission source of this probe packet. On the other hand, as a result of the judgment, if it is judged that the probe packet is a connection request to the own access point, the access point calculates a load caused by clients establishing connection to the own access point.

Then, if the calculated load is smaller than a predetermined value, the access point uses the MAC address included in the probe packet to send a probe response packet to the client at the transmission source of the probe packet. The probe response packet includes the MAC address of the client at the transmission source of the probe packet and an MAC address of the access point at a transmission source of generating the probe response packet.

After sending the probe response packet, if a request for connection is received from a client, the access point starts a procedure for connection with this client. When the procedure for connection with the client is completed, the access point sends a broadcast packet, which notifies connection with the client, into a sub-network. The broadcast packet includes the MAC address of the own access point and an MAC address of the client connected to the access point.

When the access point receives a disconnection request packet from a client, the access point sends a broadcast packet, which notifies disconnection of communication with the client, into the sub-network. The broadcast packet, which notifies disconnection of communication with the client, includes the MAC address of the own access point and an MAC address of the client requesting the disconnection.

When a state in which data communication is not executed between a access point an a client connected to the access point has continued for a predetermined time, the access point can cut the connection with the client and send a broadcast packet, which notifies the disconnection, into the sub-network. Consequently, the access point can control an excessive load caused by the client.

The access point sends information on states of connection and disconnection with a client to the sub-network as a broadcast packet. When the access point receives a broadcast packet, the access point registers information, which indicates information on a state of connection and disconnection included in this broadcast packet, in a memory provided in the own apparatus as information on a form distinguishable from states of other clients connected to the own access point.

In this way, the access point can learn, in addition to information on a client connected to the own access point, information on states of clients establishing connection to the other access points sharing an SSID with the access point.

The access point calculates a load caused by clients establishing connections to the own access point periodically at predetermined period intervals. If a calculated value is larger than a predetermined value, the access point selects one of the clients establishing connection to the own access point. Then, intensities of reception signals from the clients are measured and a client with a lowest signal intensity is selected. Instead of this, it is also possible for the access point to select a client with a largest load or a client with a low signal intensity and with a large load. In this way, the access point can select one client in order to reduce a load connected to the own access point.

Subsequently, the access point sends an inquiry packet into the sub-network as a packet for inquiring to which access point the selected client should be redirected. The inquiry packet includes an MAC address used for broadcast, the MAC address of the own access point, and an MAC address of the selected client.

When the access point receives an inquiry packet, the access point calculates a load connected to the own access point. The access point then judges whether other clients may be accepted. When the access point judges that other clients may be accepted, the access point measures an intensity of a signal of a client designated as the inquiry packet and sends a reply, which includes information on the inquiry together with a state of the load on own access point, to a access point. A reply packet is used for the reply. The reply packet includes an MAC address of the access point that has sent the inquiry packet, the MAC address of the own access point, an MAC address of the client, and the state of the load on the own access point.

In this way, the access point can learn information on reception intensities in other access points and states of loads on the other access points about a client establishing connection to the own access point by sending an inquiry packet.

When the access point receives a reply packet as a reply of the inquiry packet, the access point calculates reception intensities of a signal received from the client in the other access points from the reply packet and calculates, using the state of loads on the access points, to which access point the client should be redirected. The access point then sends a result of the calculation to the sub-network as a notification packet. The notification packet includes an MAC address of an access point of the redirection destination and an MAC address of the client to be redirected.

In this way, the access point can select an access point at a destination to which the client is redirected.

The access point, which has sent the notification packet, performs processing not responding to a probe packet from the client to be redirected for a predetermined time.

In this way, the access point can cut connection with the client to be redirected by not responding to the probe packet for the predetermined time.

On the other hand, the access point, which has received the notification packet, performs processing responding to a probe packet from the client to be redirected. By responding to the probe packet, the access point receives a connection request from the client to be redirected. By accepting the connection request, the access point and the client are then connected.

In this way, it is possible to execute switching of clients among the access points according to information included in the notification packet.

In this way, the access point can switch clients among the access points by using the inquiry packet, the reply packet, and the notification packet, respectively.

<<Constitution of an Access Point>>

Next, an example of a constitution of the respective access points used in the communication system shown in FIG. 1 will be described.

Figure 2:
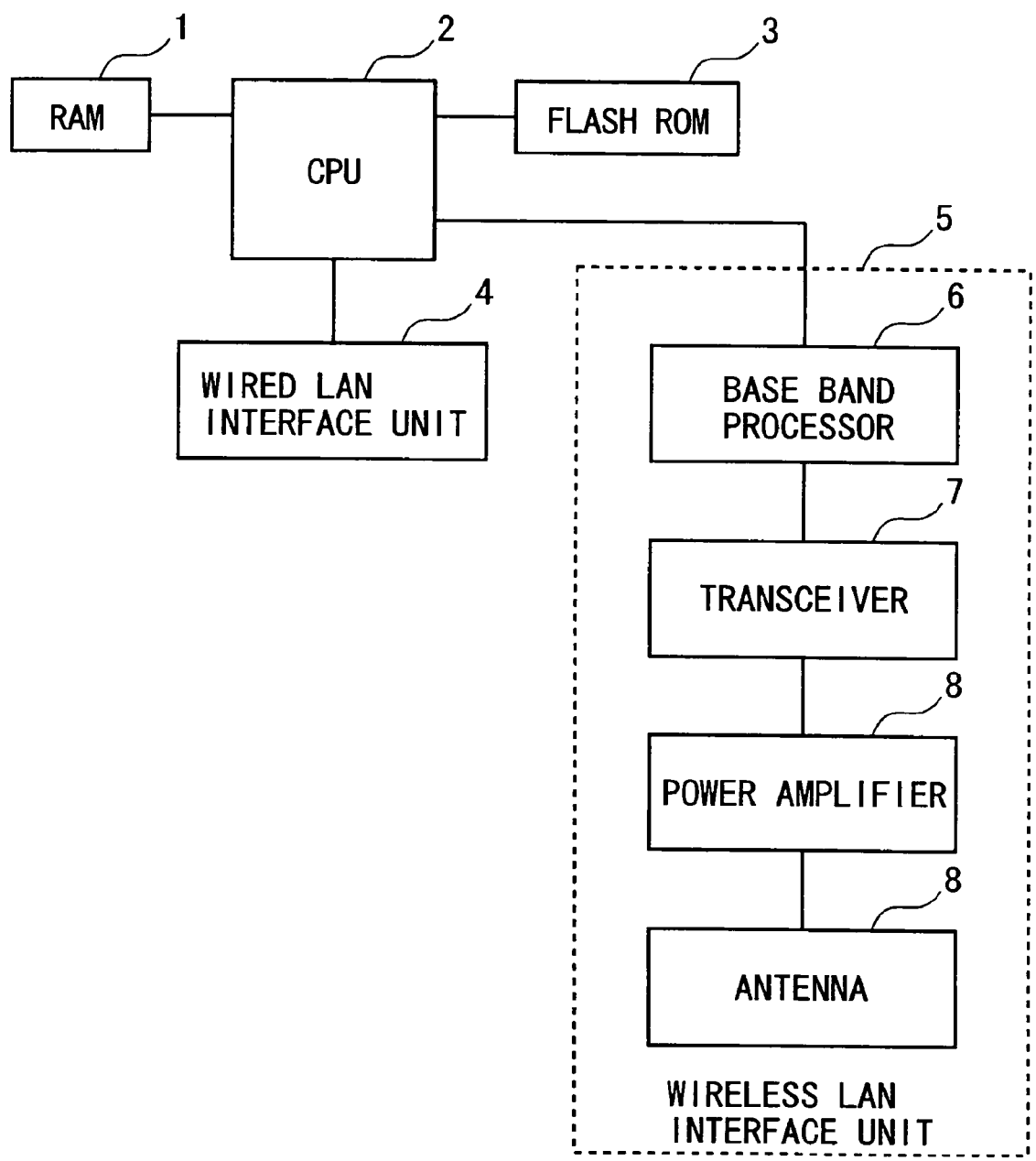
FIG. 2 is a system block diagram showing the communication system.

FIG. 2 is a block diagram showing an example of a constitution of an access point that is applicable as the access point A, the access point B, and the access point C, respectively, shown in FIG. 1.

In FIG. 2, the access point includes a Random Access Memory (RAM) 1, a Central Processing Unit (CPU) 2, a Flash ROM 3, a wire LAN interface unit 4, and a wireless LAN interface unit 5. The wireless LAN interface unit 5 includes a base band processor 6, a transceiver 7, a power amplifier 8, and an antenna 9.

The Random Access Memory 1 is a storage medium that is used as a work area when the Central Processing Unit 2 executes a control program for the wireless LAN. Identification information (MAC addresses) of all clients establishing connection to access points sharing an SSID with one another is registered in the Random Access Memory 1 as data to be used when the control program is executed. Moreover, identification information (an MAC address) of a client establishing connection to the own access point and a value of a load on the client are registered in the Random Access Memory 1.

The Central Processing Unit 2 executes a program for controlling the wireless LAN stored in the Flash ROM 3. The Central Processing Unit 2 uses the Random Access Memory 1 as a temporary storage medium in executing the program.

The Central Processing Unit 2 performs the following process according to the execution of the control program. The Central Processing Unit 2 registers an amount of communication of data from a client received from the wireless LAN interface unit 5 in the Random Access Memory 1 as a processing load. In addition, the Central Processing Unit 2 registers information on connection by the client establishing connection to the own access point in the Random Access Memory 1 from the wireless LAN interface unit 5 (the Central Processing Unit 2 is equivalent to "a unit judges whether a client apparatus is unconnected to the own service apparatus" of the present invention). Further, the Central Processing Unit 2 receives broadcast packets from other access points in the wire LAN interface unit 4 and registers information on connection by clients connected to the other access points, which is included in the broadcast packets, in the Random Access Memory 1. The Central Processing Unit 2 may obtain connection states of the clients from the information registered in the Random Access Memory 1.

When a procedure for connection of the own access point and a client is completed, the Central Processing Unit 2 transmits a broadcast packet including an MAC address of the client related to the connection procedure from the wire LAN interface unit 4. Consequently, the access point can notify other access points, which are connected via a sub-network, of the client connected to the own access point.

Further, when a procedure for disconnection of the own access point and a client is completed, the Central Processing Unit 2 transmits a broadcast packet including an MAC address of the client related to the connection procedure from the wire LAN interface unit 4. Consequently, the access point can notify other access points, which are connected via a sub-network, of the client disconnected to the own access point.

Further, the Central Processing Unit 2 calculates a magnitude of a load (e.g., a CPU load) on an access point to which the Central Processing Unit 2 belongs (the own access point) from the information on clients registered in the Random Access Memory 1. The Central Processing Unit 2 judges whether one of connected plural clients should be connected to another access point based on a result of the calculation of the load (the Central Processing Unit 2 is equivalent to "a unit judges whether it is possible to establish connection to the service apparatus" of the present invention).

For example, when a transmission band (throughput), which can be allocated to the clients, decreases to be smaller than a predetermined value, the Central Processing Unit 2 judges that the connected clients should be connected to another access point. Alternatively, when the number of clients connected to the own access point exceeds a predetermined value, the Central Processing Unit 2 judges that one of the plural clients should be connected to another access point.

When the Central Processing Unit 2 judges that the connected clients should be connected to another access point, the Central Processing Unit 2 compares reception intensities of the respective connected clients and selects a client, which should be connected to another access point, with a lowest reception intensity. In addition, when the Central Processing Unit 2 judges that the connected clients should be connected to another access point, the Central Processing Unit 2 may select a client with a largest load of processing of data. Further, the Central Processing Unit 2 may select the client from both the load of processing of data and the signal intensities using a predetermined equation.

When a load on the access point increases, the Central Processing Unit 2 selects one of the connected clients and instructs the wire LAN interface unit 4 to send an inquiry packet to the client. The wire LAN interface unit then sends an inquiry packet via the network cables to the another service apparatus (the wire LAN interface unit 4 is equivalent to "a unit sends an inquiry" of the present invention).

When the Central Processing Unit 2 receives an inquiry packet, the Central Processing Unit 2 reads out an MAC address of a client from the inquiry packet and inquires of the wireless LAN interface unit 5 about a reception signal intensity of the client in the own access point of the client. The Central Processing Unit 2 then receives a value of the reception signal intensity of the client from the wireless LAN interface unit 5. The Central Processing Unit 2 calculates a load caused by clients establishing connection to the own access point by using the Random Access Memory 1. The Central Processing Unit 2 then changes the signal intensity and the load to a form from which a reply packet can be created, and sends the reply packet to the wire LAN interface unit 4.

The Central Processing Unit 2 includes a timer for measuring a predetermined time.

The Flash ROM 3 has a control program of the wire LAN that is executed by the Central Processing Unit 2.

The wire LAN interface unit 4 is connected to other access points through network cables. The wire LAN interface unit 4 receives packets from the other access points. Further, the wire LAN interface unit 4 transmits packets to the other access points through the network cables.

The base band processor 6 converts a signal from the transceiver 7 into a bit string represented by 1 and 0. The base band processor 6 then sends the bit string to the Central Processing Unit 2. In addition, the base band processor 6 changes a bit received from the Central Processing Unit 2 to a radio signal and sends the radio signal to the transceiver 7.

The transceiver 7 is a radio communication apparatus. The transceiver 7 down-converts a signal received from the antenna 9 and sends the signal to the base band processor 6. In addition, the transceiver 7 up-converts a signal from the base band processor 6 into a carrier frequency and sends the signal to the antenna 9.

When an instruction for measurement of an intensity of a signal is sent to the wire LAN interface unit 5 from a client, the power amplifier 8 measures an intensity of a signal of the client. A result of the measurement is sent to the Central Processing Unit 2 through the transceiver 7 and the base band processor 6. The power amplifier 8 increases power of a signal to be sent to the client.

The antenna 9 receives a radio signal from a client. Further, the antenna 9 sends a radio signal to the client.

<Packet>

Next, an inquiry packet, a reply packet, and a notification packet used in the communication system will be described in detail.

Figure 3:
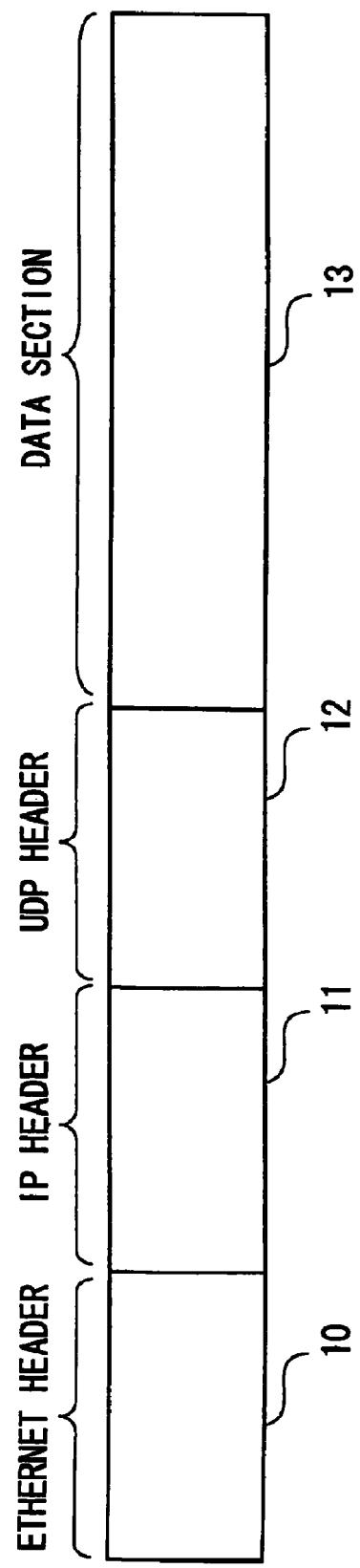
FIG. 3 is a diagram showing a packet used in the communication system.

FIG. 3 shows a format of a packet that is applied as the inquiry packet, the reply packet, and the notification packet. The inquiry packet, the reply packet, and the notification packet each have an Ethernet (registered trademark) header 10 (hereinafter represented as "LAN header 10"), an IP (Internet Protocol) header 11, a UDP (User Datagram Protocol) header 12, and a data section 13.

Next, the respective headers of the inquiry packet, the reply packet and the notification packet, and contents of the data section 13 will be described.

The LAN header 10, the IP header 11, and the data section 13 have information that depends on a type of the packets and a difference of access point for the inquiry packet, the reply packet, and the notification packet, respectively. The UDP header 12 has common information that does not depend on a type of the packets and a difference of access points.

The UDP header 12 includes a port number of a transmission source and a port number of a transmission destination. An access point uses the port numbers in order to execute a program provided in the access point. Both the port numbers take a fixed value (e.g., 6350) and do not depend on a type of the packets and an access point. The port number of a transmission source and the port number of a transmission destination may take different values.

(Inquiry Packet)

The LAN header 10 includes an MAC address of an access point at a transmission source and an MAC address used for broadcast.

The IP header 11 includes an IP address of an access point at a transmission source and an IP address used for broadcast that depends on a network address.

The data section 13 includes an identifier indicating the inquiry packet, an MAC address of an inquiry object client, and an MAC address of an access point at a redirection destination.

With the constitution described above, the access point can notify the other access points of the MAC address of the own access point and the MAC address of the inquiry object client by broadcasting an inquiry packet.

(Reply Packet)

The reply packet is a packet to be sent to an access point, which has sent an inquiry, after the access point receives an inquiry packet.

The LAN header 10 includes a MAC address of an access point at a transmission source and a MAC address of an inquiry source included in the inquiry packet.

The IP header 11 includes an IP address of an access point at a transmission source and an IP address of an inquiry source included in the inquiry packet.

The data section 13 includes an identifier indicating the reply packet, an intensity of a reception signal measured in the access point for the inquiry object client, and a value indicating a load state of the access point.

With the constitution described above, the access point can learn intensities of reception signals in other access points of the inquiry object client and states of loads and addresses of the other access points from the other access points by receiving the reply packet.

(Notification Packet)

The LAN header 10 includes a MAC address of an access point at a transmission source and a MAC address used for broadcast.

The IP header 11 includes an IP address of an access point at a transmission source and an IP address used for broadcast that depends on a network address.

The data section 13 includes an identifier indicating the notification packet, a MAC address of a redirection object client, and a MAC address of an access point at a redirection destination.

With the constitution described above, the access point can notify the MAC address of the redirection object client and the MAC address of the access point at a redirection destination.

<<Operation Examples>>

Operation examples of a communication system will be hereinafter described using flowcharts shown in FIGS. 4 to 6. First, a flowchart indicating processing for connection performed by a client will be explained and, then, two kinds of flowcharts indicating processing performed by an access point will be described.

<Operation (Processing) Example of a Client>

FIG. 4 is a flowchart showing a procedure from a state in which a client is unconnected until establishment of connection with an access point.

At a start point of processing shown in FIG. 4, the client is in an unconnected state (S1). The client broadcasts a probe packet (a probe request) including an SSID of a connection destination (S2). The SSID is used here by the client to identify an access point, from which the client is about to receive a service.

The client waits for receiving responses from access points for a given period of time (S3). The client judges whether a probe response packet responding to the probe packet is received from at least one access point within a given period of time (S4).

If the client does not receive a probe response packet (a probe response) at all, the client changes a radio channel in order to search for an access point on other radio channels (S5) Then, the processing returns to step S2.

If the client receives one or more probe response packets in step S4, the client selects an access point with a highest signal intensity from among the access points as an access point at a connection destination (S6).

The client starts a connection procedure for the selected access point (S7). The client then judges whether connection with the access point is successful (S8).

If the client fails in the connection with the access point (S8; No), the processing of the client returns to step S2. If the client succeeds in the connection with the access point (S8; Yes), a connection state is established between the client and the access point (S9).

With the processing described above, it is possible for the client to select an access point with a satisfactory state of radio communication from among plural access points, from which the probe response packets have been received, and establish connection to the access point.

<Operation (Processing) Example 1 of an Access Point>

FIG. 5 is a flowchart showing processing in which an access point switches a client establishing connection to the own access point to another access point (processing of an access point apparatus at a redirection source of the client).

First, the Central Processing Unit 2 periodically calculates loads caused by establishing connection by the client to the own access point (S10). For example, a CPU load of the Central Processing Unit 2 (FIG. 2) and the number of clients establishing connection to the own access point are calculated as the loads.

Next, the Central Processing Unit 2 judges, based on a result of the calculation of loads, whether a client establishing connection to the own access point should be redirected to another access point (S11). The judgment is performed as judgment on whether the result of calculation of loads is larger than a predetermined value given to the access point in advance. For example, when the CPU load exceeds a predetermined value (the Central Processing Unit 2 is equivalent to a unit processing a "case in which it is detected that a load of the own service apparatus is equal to or lager than a predetermined value") and when the number of clients is equal to or larger than a predetermined value (the Central Processing Unit 2 is equivalent to a unit processing a "case in which it is detected that the number of client apparatuses connected to the own service apparatus is equal to or larger than a predetermined value" of the present invention), the Central Processing Unit 2 judges that one of the clients should be redirected.

Next, the Central Processing Unit 2 selects a client to be redirected to another access point from clients connected to the own access point (the Central Processing Unit 2 is equivalent to "a selecting unit" of the present invention) (S12). The Central Processing Unit 2 selects here the client with the lowest signal intensity from among the clients as a redirection object client (the Central Processing Unit 2 is equivalent to "selecting a client apparatus with a lowest reception intensity" of the present invention). Then, a client may be calculated by taking into account not only a condition that a signal intensity is low but also a magnitude of a load of the client (e.g., an amount of data per unit time from the client).

When it is judged that the client should not be redirected to another access point, the Central Processing Unit 2 returns the processing to step S10. When it is judged that the client should be redirected to another access point, the Central Processing Unit 2 creates an inquiry packet and broadcasts the inquiry packet to a sub-network through the wire LAN interface unit 4 (S13). The inquiry packet is used for inquiring about an intensity of a signal in another access point of the selected client and a load in the access point.

The Central Processing Unit 2 judges whether a reply packet responding to the inquiry packet is received by the wire LAN interface unit 4 within a predetermined time (S14). Here, the reply packet (equivalent to "reply" of the present invention) includes an MAC address of an access point, which has sent the reply packet, and a reception signal intensity of the selected client in the access point, which has sent the reply packet. The wire LAN interface unit 4 receiving the reply packet is equivalent to a "receiving unit" of the present invention.

When the Central Processing Unit 2 judges that the replay packet is not received (S14; No), it is assumed that another access point also has a high load as in the own access point and cannot accept another client. In this case, the Central Processing Unit 2 returns the processing to step S10.

Further, when the Central Processing unit 2 receives a reply packet within the predetermined time (S14; Yes), the Central Processing Unit 2 selects an access point to be a redirection destination of the client. The access point is selected based on information included in the reply packet. In other words, the Central Processing Unit 2 selects an access point of a redirection destination based on loads in respective access points and intensities of reception signals of the respective selected clients in the respective access points (the Central Processing Unit 2 is equivalent to "a determining unit" of the present invention) (S15).

The Central Processing Unit 2 creates a notification packet for notifying other access points of the selected access point and broadcasts the notification packet into the sub-network through the wire LAN interface unit 4 (the wire LAN interface unit 4 is equivalent to a "unit transmits control information to other service apparatuses through a network" of the present invention) (S16). The notification packet includes information on the selected client and the selected access point.

In order to cut connection from the client, the Central Processing Unit 2 then performs processing not to return a probe response packet for a given period of time even if a probe packet is received from the selected client (the Central Processing Unit 2 is equivalent to a "unit inhibits for a given period of time" of the present invention) (S17). When a response to the probe packet is not received for the given period of time, the client cuts connection. Therefore, the connection from the selected client is cut (S18).

With the processing described above, when a load by a client establishing connection to the access point is larger than a predetermined value, it is possible to redirect the client to another access point.

<Operation (Processing) Example 2 of an Access Point>

FIG. 6 is a flowchart showing processing in which an access point receives an inquiry packet and connecting a client establishing connection to another access point to the own access point according to a predetermined condition (processing of an access point other than an access point of a redirection source of a client).

At a start point of the processing shown in FIG. 6, the Central Processing Unit 2 is in a state in which the Central Processing Unit 2 is capable of receiving some packet from other access points (S19). When the Central Processing Unit 2 receives some packet, the Central Processing Unit 2 judges whether the packet is an inquiry packet (S20). When the received packet is not an inquiry packet, the processing returns to step S19.

When the Central Processing Unit 2 judges that the received packet is an inquiry packet, the Central Processing Unit 2 judges whether the own access point is in a state in which the own access point can accept a client (S21). When it is judged that the own access point has a room for accepting a client, the Central Processing Unit 2 returns the processing to step S19.

When the Central Processing Unit 2 judges that the own access point is in a state in which the own access point can accept a client, the Central Processing Unit 2 measures an intensity of a signal received by the own access point from a client included in the inquiry packet. The Central Processing Unit 2 calculates a load of the own access point from information of clients establishing connection to the own access point registered in the Random Access Memory 1 (S22).

The Central Processing Unit 2 generates a reply packet including information on the load and the signal intensity and sends the reply packet addressed to the access point at a transmission source of the inquiry packet from the wire LAN interface unit 4 to the sub-network (S23).

The Central Processing Unit 2 waits for reception of a notification packet from the access point at the transmission source of the inquiry packet for a given period of time. Then, the Central Processing Unit 2 judges whether a notification packet is received within the given period of time (S24). If a notification packet is not received within the given period of time (S24; No), the Central Processing Unit 2 returns the processing to step S19.

If a notification packet is received within the given period of time (S24; Yes), the Central Processing Unit 2 judges whether an access point at a redirection destination designated by the notification packet is the own access point (S25).

Then, when the access point at the redirection destination designated by the notification packet is not the own access point (S25; No), the Central Processing Unit 2 does not respond to a probe packet from a redirection object client for a given period of time (the Central Processing Unit 2 is equivalent to a "unit inhibits transmission of a response, which indicates that connection is possible, for a given period of time in response to a probe request from the selected client apparatus" of the present invention) (S26). The Central Processing Unit 2 does not respond to the probe packet from the client for the given period of time, with the result that the own access point is not connected to at least the redirection object client (S27).

When the access point of the redirection destination designated by the notification packet is the own access point (S25; Yes), the Central Processing Unit 2 responds to the probe packet from the client (S28). Consequently, it is possible to respond to a probe packet from a redirection object client and, then, receive a connection request transmitted from the client to perform a procedure for connection with the client (S29).

With the processing described above, an access point selected from access points, which can accept a client, according to a state of radio communication between the access point and the client, and a state of a load of the access point, accepts the client, whereby it is possible to decentralize a load on the entire access point.

The processings in steps S26 and S28 may be executed only on the probe packet from the redirection object client.

<<Operational Effects of the Embodiment>>

Operational effects of the embodiment described above will be explained by using the communication system shown in FIG. 1. In a state in which the clients a, b, and c are connected to the access point A, if a load increases (e.g., a CPU load of the Central Processing Unit 2 exceeds a predetermined value), the access point A selects a redirection object client from the clients a, b, and c. Since a reception signal intensity of a radio wave from the client c is the lowest, the Central Processing Unit 2 selects the client c as a redirection object.

Next, the access point A broadcasts an inquiry packet to the sub-network. The inquiry packet is received by the access point B and the access point C. The access point B and the access point C each measure a reception signal intensity of a probe packet from the client c and transmits a reply packet, which includes at least a result of the measurement (a signal intensity) and information on a load of the access points, to the access point A through the sub-network.

When the access point A receives reply packets within a given period of time, the access point A determines an access point at a redirection destination from the access points at the transmission sources of the reply packets. For example, when the access point A receives reply packets from the access point B and the access point C, the access point A compares signal intensities included in the respective reply packets. When the signal intensity in the reply packet from the access point B is the highest, the access point A determines the access point B as an access point at a redirection destination. Then, the access point A can take into account the load information included in the reply packet as a condition for determination of the access point.

The access point A broadcasts a notification packet, which indicates that the access point B is determined as a redirection destination (a new connection destination), to the access point B and the access point C through the sub-network. Consequently, the notification packet is delivered to the access point B and the access point C.

Thereafter, the access point A does not respond to the probe packet from the client c for a given period of time. Further, when the access point C is informed, through the reception of the notification packet, that the access point B is determined as the redirection destination of the client c, the access point C does not respond to the probe packet from the client C for a given period of time. On the other hand, when the access point B is informed, through the reception of the notification packet, that the access point B itself is determined as the redirection destination of the client c, the access point B continues a state in which the access point B responds to the probe packet.

Therefore, only the access point B, which is determined as the redirection destination, responds to the probe packet from the client c. In other words, the client c comes into a state in which the client c receives a probe response packet only from the access point B. Consequently, the client c executes a procedure for switching a connection destination from the access point A to the access point B. In this way, the connection destination of the client c is switched from the access point A to the access point B.

According to the embodiment, even if plural clients concentrate on one access point, with the operation described above, it is possible to forcibly redirect one of the plural clients to another access point, to which the client is connectable (which has a common SSID), according to the method of selecting an access point implemented in clients, and the method of selecting an access point is based on a reception signal intensity of a probe response packet. Consequently, it is possible to realize decentralization of connection destinations of the clients. In addition, it is possible to reduce a load on an access point at a redirection source and inhibit a decrease in a usable bandwidth (throughput) per one client.

Further, according to the embodiment, an access point, which has received an inquiry packet, judges whether it is possible for the access point to accept any client. If it is impossible to accept a client, the access point does not transmit a reply packet. Consequently, an access point, which does not transmit a reply packet, is excluded from candidates of a redirection destination. Therefore, an access point at a redirection source can select an access point at a redirection destination from other access points that are capable of accepting a client.

Further, according to the embodiment, in an access point at a redirection source, it is possible to select an access point, which can secure a satisfactory communication quality (e.g., a communication quality equal to or higher than the present communication quality), as an access point at a redirection destination based on information about a signal intensity, or information about a signal intensity and a load included in a reply packet. Consequently, even if switching of an access point is carried out, a redirection object client can secure a certain degree of (satisfactory) communication quality in communication with the access point at the redirection destination.

Further, in the embodiment, a modification or an addition of a constitution for performing the operation described above is not required for a client (terminal). In other words, it is possible to use the convention client directly. Therefore, it is possible to reduce costs necessary for installation of the communication system according to the embodiment.

INCORPORATION BY REFERENCE

The disclosures of Japanese patent application No. JP2005-102449 filed on Mar. 31, 2005 including the specification, drawings and abstract are incorporated herein by reference.

What is claimed is:

1. A service apparatus providing a radio connection service to client apparatuses by returning a response in response to a probe request from an unconnected client apparatus to execute a radio connection procedure with the client apparatus, and by returning a response in response to a probe request from a connected client apparatus to continue a connected state with the client apparatus, the service apparatus comprising:
  a selecting unit to select a client apparatus to which connection should be disconnected when a predetermined state is detected;
  a requesting unit to request other service apparatuses connected through a network to return a response, which indicates that connection is possible, in response to a probe request from the selected client apparatus; and
  a unit to receive the probe request from the selected client apparatus and to inhibit transmission of the response that indicates that continuing the connected state with the selected client apparatus is possible, in answer to the probe request from the service apparatus to the selected client apparatus for a given period of time to disconnect the connection with the selected client apparatus.

2. The service apparatus according to claim 1, wherein the requesting unit includes:
  a unit to transmit an inquiry to inquire states of the other service apparatuses;
  a receiving unit to receive, from the other service apparatuses responding to the inquiry, replies that include state information indicating the states of the other service apparatuses through a network;
  a determining unit to determine, as a new connection destination of the selected client apparatus, one of the other service apparatuses as transmission sources of the replies based on the state information included in the received replies; and
  a unit to transmit to the other service apparatuses, through a network, control information for the determined one of the other service apparatuses to respond to the probe request from the selected client apparatus and the other service apparatuses other than the determined one of the other service apparatuses to inhibit transmission of the response, which indicates that connection is possible, corresponding to the probe request from the selected client apparatus, for the given period of time, the control information including identification information of the determined one of the other service apparatuses and identification information of the selected client apparatus.

3. The service apparatus according to claim 2, wherein the state information includes intensities of reception signals from the selected client apparatus in the other service apparatuses, and
    the determining unit determines the one of the other service apparatuses with the best reception signal intensity as a connection destination of the client apparatus.

4. The service apparatus according to claim 3, wherein the state information further includes information indicating processing loads in the other service apparatuses, and the determining unit determines the one of the other service apparatuses to be a connection destination of the client apparatus, based on the reception signal intensities and the processing loads.

5. The service apparatus according to claim 2, further comprising:
    a unit to inhibit, when the identification information of the service apparatus included in the control information received from the other service apparatuses does not coincide with identification information of the own service apparatus, the transmission of the response which indicates that connection is possible corresponding to the probe request from the selected client apparatus for the predetermined period.

6. The service apparatus according to claim 2, further comprising:
    a unit to judge whether a client apparatus as a transmission source of the probe request is unconnected to the own service apparatus; and
    a unit to judge, when the client apparatus is unconnected, whether it is possible to connect the client apparatus to the own service apparatus, wherein when the client apparatus cannot be connected, the inquiry is executed on the other service apparatuses.

7. The service apparatus according to claim 1, wherein the selecting unit selects a client apparatus with a lowest reception signal intensity from plural client apparatuses connected to the own service apparatus.

8. The service apparatus according to claim 1, wherein the selecting unit executing the selection of the client apparatus, when it is detected that a load on the own service apparatus is equal to or larger than a predetermined value.

9. The service apparatus according to claim 1, wherein the selecting unit executing the selection of the client apparatus, when it is detected that the number of client apparatuses to be connected to the own service apparatus is equal to or larger than a predetermined value.

10. A method of controlling switching of a connection destination of a client apparatus by a service apparatus included in a group of service apparatuses providing a radio connection service to client apparatuses by returning a response in response to a probe request from an unconnected client apparatus to execute a radio connection procedure with the client apparatus, and by returning a response in response to a probe request from a connected client apparatus to continue a connected state with the client apparatus,
    selecting a client apparatus to which connection should be disconnected when a predetermined state is detected,
    requesting other service apparatuses connected through a network to return a response, which indicates that connection is possible, in response to a probe request from the selected client apparatus;
    receiving the probe request from the selected client apparatus; and
    inhibiting transmission of the response that indicates that continuing the connected state with the selected client apparatus is possible, in answer to the probe request from the service apparatus to the selected client apparatus for a given period of time to disconnect the connection with the selected client apparatus.

11. A non-transitory storage medium readable by a service apparatus, storing a program for causing the service apparatus included in a group of service apparatuses providing a radio connection service to client apparatuses by returning a response in response to a probe request from an unconnected client apparatus to execute a radio connection procedure with the client apparatus, and by returning a response in response to a probe request from a connected client apparatus to continue a connected state with the client apparatus, to perform control for switching a connection destination of the client apparatus,
    the program causing the service apparatus to perform:
    selecting a client apparatus to which connection should be disconnected when a predetermined state is detected,
    requesting other service apparatuses connected through a network to return a response, which indicates that connection is possible, corresponding to the probe request from the selected client apparatus,
    receiving the probe request from the selected client apparatus; and
    inhibiting transmission of the response that indicates that continuing the connected state with the selected client apparatus is possible, in answer to the probe request from the service apparatus to the selected client apparatus for a given period of time to disconnect the connection with the selected client apparatus.

\* \* \* \* \*